(No Model.)

C. H. FARLEY.
EYEGLASSES.

No. 373,350. Patented Nov. 15, 1887.

Witnesses:
H. J. Isley
F. L. Mosely

Inventor.
Cyrus H. Farley
By Herbert G. Briggs
Attorney

UNITED STATES PATENT OFFICE.

CYRUS H. FARLEY, OF PORTLAND, MAINE.

EYEGLASSES.

SPECIFICATION forming part of Letters Patent No. 373,350, dated November 15, 1887.

Application filed February 21, 1887. Serial No. 228,358. (No model.)

*To all whom it may concern:*

Be it known that I, CYRUS H. FARLEY, residing at Portland, in the county of Cumberland and State of Maine, have invented certain new and useful Improvements in Eyeglasses; and I do hereby declare that the following is a full, clear, and exact description of the invention, which will enable others skilled in the art to which it appertains to make and use the same.

The accompanying drawings, forming a part of this specification, show the construction and operation of my newly-devised eyeglass-frame.

Figure 1:
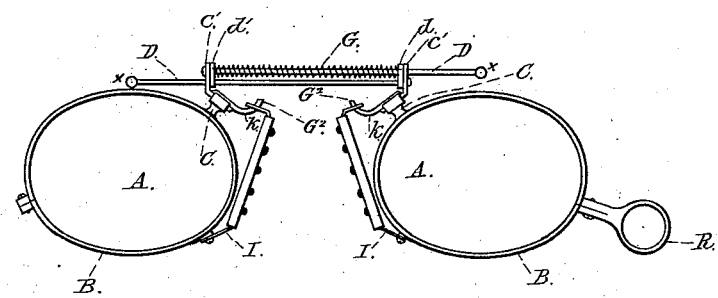
Figure 2:
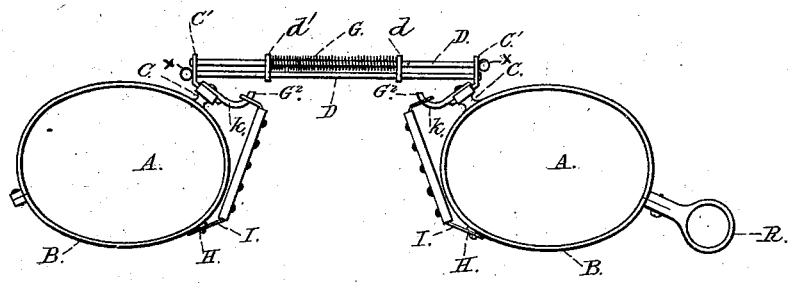
Figure 3:
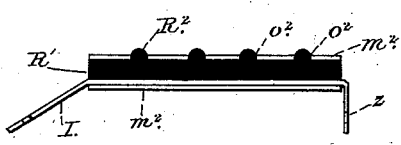
Figure 4:
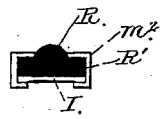
Figure 5:
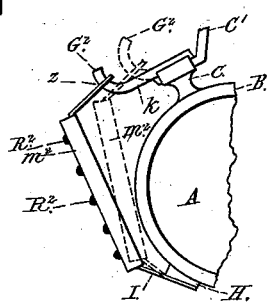

Figure 1 is a view of my newly-invented eyeglass-frame. Fig. 2 shows a view of the same with the lenses pushed apart as in the act of applying to the wearer's nose. Fig. 3 represents a detail view, in longitudinal section, of a nose-piece. Fig. 4 indicates an end view of the nose-piece. Fig. 5 illustrates the method of varying the positions of the nose-piece.

In the several figures of the drawings the same letters of reference point out corresponding parts.

The object of my present invention is to provide an eyeglass-frame so constructed that the lenses can be separated in a straight line.

Another object of my invention is to augment the usefulness of eyeglass-frames by the connection with them of nose clamps or pieces that can be adjusted to fit any nose or any abnormal development of the same.

It is difficult, and in some cases impossible, for people afflicted with certain deformation of the eye to wear cylindrical lenses so mounted that there is at any time the least deviation of the axes of the lenses from the deformity of the eye. For this reason many who desire to wear spring-bowed eyeglasses instead of spectacles are obliged to use spectacles, because in the use of the spring-bows the lenses open on a curve and the axes change with every movement of opening or shutting, and a slight change of position will very materially impair and disturb the vision.

By my construction the above difficulty is obviated, because the lenses, instead of moving on a curve, separate from each other in a straight line and the axes of the lenses always keep in a uniform position or angle, the same as in spectacles.

I will first describe my invention in connection with all that is necessary to the full and complete knowledge thereof, and then indicate in the claims the parts believed to be new.

Referring to the drawings, the letters A A indicate the lenses of an eyeglass. These lenses are the common cylindrical lenses, and, in accordance with ordinary construction, are mounted in rims B B. At the top of each rim B is firmly set an ear or post, C. In a groove in the tops of these posts C are placed plates C', which are bent at their end to stand at right angles to a line passing through the centers of the lenses A A. They are provided with orifices, into which are fitted two parallel bars, D D, placed one over the other. The upper parallel bar D is provided with a rigidly-connected stop, $d$. The lower bar D has a similar stop, $d'$. The two plates or stops $d$ and $d'$ are connected to both the bars D. The stop $d$, rigidly affixed to the upper bar, has an orifice at its lower end, through which slides the lower bar, and the stop $d'$ has at its upper end an orifice, through which the upper parallel bar slides.

The bars D D are provided at their ends with knobs X, which keep them from slipping through the orifices in the plates C'. Compressed between the plates or stops $d$ and $d'$ and surrounding the upper parallel bar is seen a spiral spring, G.

By using the two parallel rods D D a frame can be made stiff enough to maintain the parallelism of the lenses without twisting or bending and without making the frame so heavy as to be objectionable to the wearer, and in order that the spring G shall accomplish its purposes the said bars D D must slip by each other. To do this necessarily the ends of said bars on opposite sides must extend beyond the standards $d\ d'$.

Referring again to the drawings, a novel adjustable clamp or piece is seen for holding the eyeglasses fast to the wearer's nose, which is made as follows: A flat strip of metal is pierced with a series of small orifices arranged at equal spaces lengthwise of the strip. The strip is then placed in a suitable die and swaged into a double right angle. A strip of rubber is then placed within the bent-up strip. Over this is placed a backing strip or plate. Again, by swaging, the sides of the bent-up strip are turned over upon the backing-strip and the parts are driven hard together, which causes the rubber to press through the orifices and protrude at equidistant points.

The construction of the nose-piece above described is fully illustrated in Figs. 3 and 4 of the detail, in which the letter $m^2$ represents the perforated metallic strip; $o^2$, the orifices; R', the rubber strip; $R^2$, the protruding knob of rubber, and I the backing-strip, which is also of metal.

The nose-piece is applied to the rims of the lenses as follows: The backing-strip I is attached by means of any convenient connection—such as a screw—at the point H. At their upper ends the plates I are bent nearly to a right angle, and are provided with orifices $z$, which are to hook over the turned-up ends of the adjustable connections $G^2$, which find a secure seat in the grooves in the tops of the posts or standards C on the tops of the rims B.

For the purpose of making the nose-pieces adjustable I make the connections $G^2$ of some metal that can be easily bent without danger of breaking, so that by pressure I can change the hook at the end and make the clamp or nose-piece conform to all the inclinations of the wearer's nose.

In Fig. 5 of the details the solid outlining represents one position of the clamp or nose-piece, and dotted outlines represent the position of the same after the hook has been pressed into another position.

The clamp or nose-piece constructed and operated as above described is very simple in construction and easily operated, and in use will be found very effective for the purpose for which it was designed. The protruding knobs of rubber will hold on to the wearer's nose with great tenacity, and will to a great extent overcome all liability of the glasses being thrown down from the nose by reason of any sudden movement of the wearer's head.

The application of eyeglasses constructed as described is as follows: The tip or handle is grasped between the thumb and second finger of the right hand. The glasses are raised to the face. The rubber-padded clamp I is pressed against the right side of the nose. The tip of the right forefinger is now placed against the knob $x$. A slight pressure is exerted by the fore finger compressing the spring G between the stops $d\ d'$. This causes the left-hand lens to move on a direct straight line away from the right-hand lens. The clamp or nose-piece is then brought to position against the left side of the nose. As soon as the forefinger tip is removed from the end of the bar D the expansive force of the compressed spring G tends to draw the lenses together. The expansive force of the spring G is intended to be just sufficient to give the nose an easy pinch, about the same as that exerted by the ordinary spring-bow.

The advantages of my newly-devised eyeglass-frame are several: First, by its use the optician is able to get glasses from prescription as accurately as in spectacle-frames; second, in placing the frame upon the nose the lenses separate laterally in a straight line, and therefore the angle of the axes of the lenses is not changed; third, the pupillary distance of the lenses can be easily obtained with accuracy; fourth, the advantages of the rubber-padded clamp or nose-piece heretofore set out; fifth, by this mode of construction the glasses can be put on the wearer's nose with one hand.

Other advantages might be enumerated; but sufficient has been shown to prove that my invention is of great utility.

What I claim as my invention, and desire to secure by Letters Patent, is—

1. In an eyeglass-frame, in combination with the rims, the nose-pieces made as described and provided with the protruding rubber points $R^2$.

2. The combination, with the rims and lenses of an eyeglass, of the parallel rods D D, the stops $d\ d'$, the spring G, the nose-pieces constructed as herein set forth and having protruding rubber points $R^2$, and the adjustable connections $G^2$, substantially as set out.

3. The combination of the metal strip $m^2$, provided with proper orifices, $o^2$, backing-strip I, rubber R', and rubber points $R^2$, substantially as and for the purposes set out.

4. In eyeglasses designed for preserving the parallelism of the lenses, the combination, with the lens-holding frames, of parallel rods, one end of each rod being affixed to a standard set on the rim of a lens-holding frame, the other end projecting through and free to slide in an orifice in its opposite standard, said rods having at their extremities knobs to prevent withdrawal from the orifices, and having spring-stops between the standards, in which they slide, and a spiral spring surrounding one of the rods between the spring-stops, all the parts so assembled and coacting as to be capable of separating the lenses in a right line under pressure exerted upon the projecting end of one of the parallel rods and automatically drawing together by the recoil of the spiral spring when pressure is removed from the rod's end.

In testimony that I claim the foregoing as my own I have affixed my signature in the presence of two witnesses.

CYRUS H. FARLEY.

Witnesses:
JOHN F. BARRETT,
H. G. BRIGGS.